July 16, 1957 T. G. BELL 2,799,641
ELECTROLYTICALLY PROMOTING THE FLOW OF OIL FROM A WELL
Filed April 29, 1955 3 Sheets-Sheet 1

INVENTOR
THOMAS GORDON BELL
ATTORNEY.

INVENTOR
THOMAS GORDON BELL

United States Patent Office 2,799,641
Patented July 16, 1957

2,799,641

ELECTROLYTICALLY PROMOTING THE FLOW OF OIL FROM A WELL

Thomas Gordon Bell, Elkton, Md., assignor of fifteen percent to John H. Bruninga, Sr., one percent to John H. Bruninga, Sr., trustee for Irene Bruninga Swartz, and one percent to John H. Bruninga, Sr., trustee for John H. Bruninga, Jr.

Application April 29, 1955, Serial No. 505,005

19 Claims. (Cl. 204—180)

This invention relates to oil wells, and more particularly to processes for promoting flow of oil from an oil formation into a well bore extending to the formation and completed for production of oil therefrom. Applicant herein is the applicant in application Serial No. 329,710, filed January 5, 1953, and now abandoned.

In the art of recovering oil from a subterraneous formation, a prospective formation is generally first explored for oil, which may be accomplished by various methods of geophysical exploration. Sometimes drilling is proceeded with without such explorations. The first well in a given area is generally referred to as a "wildcat" well. In the drilling of a well, two general systems are employed in the United States, Canada and most foreign countries, namely: by cable tool drilling, in which a heavy drilling bit, many feet in length, is moved up and allowed to drop so as to produce the hole by displacement. The cuttings are then periodically bailed out after periodical sinking of the hole. In a "rotary" system, generally used, an enlarged bit at the end of a drill stem or drill pipe is rotated while it is being let down in the hole to-be-formed. A drilling fluid is pumped down the drill pipe, passed through holes or eyes in the bit and rises outside of the drill pipe to the surface carrying the cuttings with it, these cuttings being then separated from the "mud" or fluid by gravity separation along a settling ditch or passed over a screen, or both, the drilling fluid then proceeding to a sump for recirculation. In the cable tool system, such a drilling fluid may also be employed. This drilling fluid performs a number of functions, namely, to carry the cuttings to the surface as above described and also to line the bore-hole by a filtering action of the liquid part of the fluid into the bore-wall. Where an aqueous drilling fluid is employed, in order to give it body, various solids may be employed such as clay, a highly colloidal clay such as bentonite or even gelatinized starch. In order to impart specific gravity to the drilling fluid, a heavy material such as barytes may be employed, and to control the viscosity, one of the viscosity-reducing agents such as a polyphosphate may be employed. Where the liquid part of the drilling fluid is oil, such as fuel oil, various viscosity-imparting agents and barytes may be employed.

Where an aqueous drilling fluid is employed, the water passes into the formation leaving the solids behind on the wall, the operation being analogous to a filtering operation. Frequently, a producing formation will be "passed up," because the weight and character of the drilling fluid is such that the bore-hole walls will be sealed. Where the water passes into the producing formation, then there will be a condition of interfacial tension effects between the water and the formation solids, such as sands, which impede the flow of oil into the formation unless the formation pressures are high. While the passage of water into the formation may be reduced by the employment of bentonite and more so by the employment of gelatinized starch or like acting material, there will still be considerable passage of water into the formation.

During the course of drilling, the bore hole is cased usually at various stages in sinking the well, the casing operation being performed by a steel casing let down into the hole and which is cemented in place to shut off water formations and prevent caving and there may be a number of "strings" of casings in a well.

As noted above, in the system of drilling employed, this drilling may be through a producing formation without knowledge thereof to the driller, unless pressures are abnormally high, which pressures are kept down by barytes or other "weighting material." In order to avoid such passing up of a producing formation, various means are resorted to during the course of drilling. One method is to periodically employ a hollow core drill which will produce a core which is examined in the laboratory. Another method is to employ an electrical apparatus let down into the well to locate a producing formation. Another method is to take side samples out of this side wall by suitable apparatus let down into the well.

After a producing formation has been traversed by the drill stem, the next step is to complete the well for production. The drilling fluid is accordingly bailed out of the well, but that leaves the coating of clay, etc., on the bore walls, which must be removed at the producing formation. For this purpose, the well may be "swabbed" by letting down a swabbing tool which will take off the drilling fluid solid from the bore hole at the producing formation. Another method is to employ acid together with a corrosion inhibitor. Another method is to apply shots of nitroglycerine. The formation may then be expanded at the producing formation by a suitable expanding instrument. The bottom of the hole is then provided with a pack of gravel called a "gravel pack," and this may be partially done before the screen leading to the tubing is let down into the well. This tubing is smaller than the well bore including the casings, and where the pressure is not sufficient to cause the well to flow to the top, a pump cylinder and piston are provided near the bottom of the well and below that is a screen around which gravel may be packed. The piston is provided with a pump rod which extends to the top of the well and is connected to a suitable pumping mechanism, although in some cases gas and air lifts are employed. The tubing passes through a cap on the top of the casing which is called a "casing head" provided with a packing around the tubing. The tubing itself is also provided with a cap which may be packed around the pump rod. Extending from the tubing is the flow line which is a pipe or a series of pipes leading from the tubing to the storage for the economic component.

Where the casing which is cemented in place terminates above or at the top of the producing formation, the well is called an "open hole" well. Sometimes, however, a casing may extend through the formation and indeed through several formations. In such a case, what is called a "gun perforator" is employed. This is a solid cylinder of steel provided with radially extending barrels which are loaded with cartridges or other high explosive materials. When this gun perforator reaches the producing formation, the charges are fired, resulting in perforating the casing by the bullets of the cartridges or by the explosive itself, and even the cement, so as to provide holes extending into the producing formation. The casing below the producing formation can then be plugged by a device called a "packer," which is simply an expansible plug let down the well by a pipe or rod and expanded. If the well is not a flowing well, a screen with its gravel pack and a pump may be installed as before. If desired, the casing above the region of the packing may be cut by a "casing cutter," which is in the form of an expansible boring bar let down into the casing and rotated so as to cut through the casing and even along the casing to take out any desired length of the casing. The casing itself, of course, is supported by the cement. This cutting of the casing may be in the regions of the gun perforations and accomplished either before or after gun perforation. A packing is, of course, employed as before where necessary. The hole may also be enlarged by counterboring to receive the screen and the gravel pack.

In production, and we will for convenience here limit ourselves to oil as the economic component, the oil will flow into the bore hole by the operation of various agencies. The oil may flow in by gravity, although that is opposed by the capillary attraction of water usually occurring with oil, or oil itself, for the formation such as sands. Generally, however, this flow is probably caused by the pressure of gas behind the oil or by the hydrostatic action of water behind the oil. If the pressure is sufficient, we will have a flowing well, but if not sufficient, a pump must be employed. Oil as well as water will, of course, wet the sands, although water will have a higher capillary attraction, the surface tension of water being about two and one-half times that of crude oil, so that in the frequently small passages between the sand grains or the pores of a limestone formation, the capillary attraction will be high requiring a large pressure behind the oil to force it into the well bore. The result is, therefore, that some formations, although containing oil, actually appear to be unproductive.

During production, the pressure behind the oil will usually decrease as time goes on so that the flow of oil into the well bore will continuously decrease until finally there will be no flow. The result is, therefore, that only a part of the oil is actually recovered from the formation.

Various methods have been employed for promoting flow of oil into a well. In one process which has been used is to run crude oil or gas into the oil string or tubing until sufficient pressure is developed against the inside of the screen and perforations to cause the oil to break through against the formation pressure. Momentarily, reversal of the direction of the flow through the perforations may overcome the high surface tension of the water and may dislodge much of the material packed against the outside of the pipe so as to again bring the oil into production or to promote its flow into the producing well.

The system which has been employed since 1879, and is still employed, is known as "the water-flooding process." This process is described by Uren, Petroleum Production Engineering (1939), Exploitation, pages 444–459. This process operates by introducing water under pressure into one well, causing movement of the formation fluids to another well or wells that are flowed or pumped for oil in the usual manner. As the water progresses slowly through the formation, it gathers ahead of its advancing front a bank of oil which is eventually forced from the formation into the producing well or wells. By this means, the capillary-held oil previously occupying a part of the pore space is largely displaced. In addition to this, the water through operation of interfacial tension effecting preferentially wetting of the mineral surfaces, displaces a part of the adherent oil from the previously oil-wet surfaces. This latter effect, however, is ordinarily incomplete unless aided by addition of flooding agents having the property of promoting release of the adherent oil. The value of a process of recovery, which may be only partially successful in releasing adherent oil, is better appreciated when the great area of the formation exposed to the oil and providing an opportunity for adhesive retention is considered. A large part of the original oil content of the formation is required merely to wet the mineral surfaces. Neither the gas injection nor vacuum methods of recovery have any important influence on the volume of adherent oil retained, operating primarily in reducing the percentage of capillary-held oil. Water flooding, on the other hand, may under favorable circumstances, recover a large part of both the capillary-held and adherent oil. Processes of recovery based on flowing crude oil or gas into the well are much less efficient than water flooding. The above is the theory of Uren and is substantially followed by later publications. At its best, however, the water flooding process is costly, requiring time and extensive plant installations and the cost of recovery per barrel is rather high, although it is still practiced to date.

One of the objects of this invention, therefore, is to provide a novel process for promoting oil flow from an oil-bearing formation into a well bore extending to the formation and completed for production of oil therefrom, and to provide a system which is simple, efficient and not costly.

In accordance with this invention, there is directly impressed on the producing formation and on the oil therein at a substantial distance from the well bore which has been completed for production, the positive of an electromotive force of a source of substantially unidirectional electric current of which the negative of the electromotive force is directly impressed on the formation adjacent the well bore, the electromotive force impressed on the formation being of a character and the voltage thereof being of sufficient potential to cause directly by virtue of the electromotive force so impressed, flow of oil in and along the formation from the positive to the negative and into the well bore in accordance with the amperage of the current flow, caused by virtue of the electromotive force so impressed, along the formation from the positive to the negative. In the embodiments disclosed the electrodes are insulated from the ground above the producing formation but these electrodes make contact with the formation; accordingly, the electromotive force is impressed directly on the formation so as to cause flow of oil in and along the formation in accordance with the amperage flow between the electrodes by virtue of the electromotive force so impressed. In an illustrative embodiment, the electric current is a unidirectional pulsating electric current in which the pulsations are of substantial durations so as to in effect impart a series of vibrations or "blows" on the formation fluid. The pulsations are of substantial durations, as distinguished from any incipient pulsations in an ordinary direct current generator provided with a commutator where the frequency of the current rectified is high, i.e., on the order of many cycles per second, viz., 30 to 60 cycles per second. In accordance with this invention, the frequency of the pulsating current is low, viz., in the embodiments disclosed, the frequency is on the order of 6 to 30 cycles per minute. In accordance with one embodiment, the voltage or potential of the electric current is moderate, viz., on the order of 70 volts, causing a current flow on the order of 10 amperes. In accordance with another embodiment, a relatively high voltage electromotive force, viz., on the order of 1,000 to 3,000 volts, but of relatively short duration, as by the discharge of a charged capacitator or condenser, is impressed upon the formation to impart a surge to the formation oil. An asynchronous alternating current having a positive of high and a negative of low amplitude, particularly of low frequency, may however be employed as hereinafter described.

Further objects will appear from the detailed description taken in connection with the accompanying drawings in which will be described and illustrated various illustrative embodiments of this invention; it is to be understood, however, that this invention is susceptible of various other embodiments within the scope of the appended claims.

In the accompanying drawings.

Figure 1:
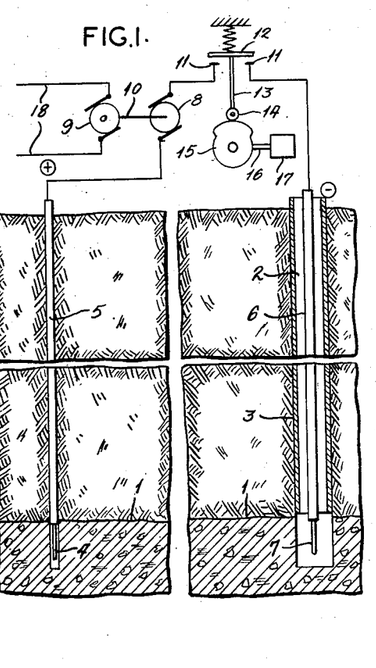
Figure 1 is a diagrammatic view of a simplified or elementary system or apparatus embodying this invention.

Figure 1 is a diagrammatic view of a simplified or elementary system. The subterranean oil bearing formation is generally indicated at 1. A well bore 2 is shown as extending to the formation, this well bore being shown as provided with a casing 3 which may extend nearly to the formation so as to provide what is known as an "open hole." This well bore is one which has been completed for production of oil from the formation and this completion may have been performed in any standard method after the drilling of the well has been completed to the producing formation. Where a mud-laden drilling fluid or drilling mud has been employed during the course of drilling of the well, the well bore will have been bailed of this fluid and the hole will have been swabbed and the casing cemented in place. Usually the bottom of the hole is provided with a "gravel pack." In some instances, the well bore at the producing formation may have been acidized by application of acid before the application of the gravel pack.

As previously explained, the initial flow of oil into the producing well is brought about by pressure of fluid behind the oil which may be gas or water, and if this pressure is sufficient, we will have a flowing well which requires no pumping. If, however, the pressure is not sufficient to force the oil from the producing formation into the producing well, then there will be no flow and as explained above, this may be brought about by the interfacial tension effects between the solid formation and water, and in some cases, oil, so that the flow of oil and even of water is held back by the capillary-held oil or water. There may, moreover, be other reasons or factors such as the clogging of the formation or the insufficient porosity of the formation. In any such event, the flow of oil from the producing formation into the producing well will be retarded or indeed stopped or later prevented.

In Figure 1 the flow of oil from the producing formation into the producing well is promoted by the following means: An electrode 4 is placed to extend into the producing formation. In its simplified form as shown in Figure 1, a small hole may be drilled from the surface into the producing formation 1 by equipment often employed in drilling holes for electrophysical exploration. This electrode may be the bare or stripped-off end 4 of an insulated wire 5, let down the hole. A like insulated wire 6, whose end is bare to provide an electrode 7, is placed in the well bore 2 and which extends adjacent or into the producing formation as in the case of the electrode 4. The actual electrodes 4 and 7 are therefore insulated from the ground above the producing formation 1, but the electrodes 4 and 7 make contact with the formation 1 and so extend directly to the formation. The electrode 4 is positioned a substantial distance from the well bore 2 and from the electrode 7, and which may vary from hundreds of feet to over a thousand feet. A source of substantially direct current is shown in Figure 1 in the form of a direct current generator 8 which may be driven by a motor 9, receiving current from a source 18 which may be alternating or direct current, the driving shaft between the motor and the generator being indicated at 10. The positive of the generator 8 is connected to the wire 5 and its electrode 4, while the negative is connected in a manner hereafter described to the insulated wire 6 and its electrode 7. In an illustrative example, the voltage of the generator 8 is on the order of about 85 volts, and this generator is designed to deliver on the order of 100 or more amperes of current. In such example, the depth of the formation may be from 600 to 3,000 feet and the spacing between the electrodes 4 and 7 may be from 600 to 1,000 feet and over.

In the operation of the system so far described in Figure 1, there is thus impressed directly on the formation by the electrode 4, the positive of an electromotive force of a substantially unidirectional electric current of which the negative of the electromotive force is impressed at 7 directly on the formation adjacent the well bore; the electromotive force impressed on the formation is, however, of a character and the voltage thereof is of sufficient potential to cause directly by virtue of the electromotive force directly impressed on the formation, flow of oil in and along the formation from the positive to the negative and into the well bore in accordance with the amperage of the current flow along the formation from the positive to the negative. It has been found in practice and substantiated by actual extended tests, that there will be such flow of oil from the positive to the negative and into the producing well at the right and that the flow of a well having a low flow of oil has been doubled and even tripled, particularly in a well where the oil flow was originally low.

Returning to Figure 1, it has been found that the flow of oil into the producing well is much increased by employing a substantially unidirectional but pulsating electric current whose frequency is low, viz., on the order of 6 to 30 cycles per minute as noted previously. In Figure 1, interposed in the electric circuit, is a circuit maker and breaker in the form of stationary contacts 11 and a spring-closed movable contact 12. In diagrammatic form, the movable contact 12 has a stem 13 provided with a roll 14 bearing on a cam 15, which is driven by a shaft 16 from a suitable motor 17 (which may be an electric motor). This motor operates through a reduction gear, not shown, so as to move the cam 15 on the order of revolutions per minute. Thus, as a practical example, the cam may be moved 30 revolutions per minute to make and break the circuit once every two seconds. However, the make and break has been found satisfactory also at a revolution of the cam of 12 times per minute so as to make and break the current every five seconds. While it has been found advantageous to have equal durations of make or break, that is not necessary because the make may be longer than the break and vice versa.

With the system operating by a pulsating substantially unidirectional current in the manner described, it is believed that the improved results are obtained by reason of the fact that the application of the electromotive force to the formation and the current flowing therealong will be in the form of impulses so as to operate by a vibratory or blow action, somewhat analogous to sonic pulsations so as to more effectively cause flow of the oil along the formation. Furthermore, it is believed that such pulsating substantially unidirectional electric current will avoid to a large extent electrolysis, even though such electrolysis does not have any material effect on the electrodes.

Figure 1, illustrating a simplified system, has been so far discussed to show in what manner the oil in a formation is caused to flow into a producing well extending into the formation. The oil may, of course, be recovered from the producing well in any suitable manner, an embodiment of which will now be described.

Figure 2:
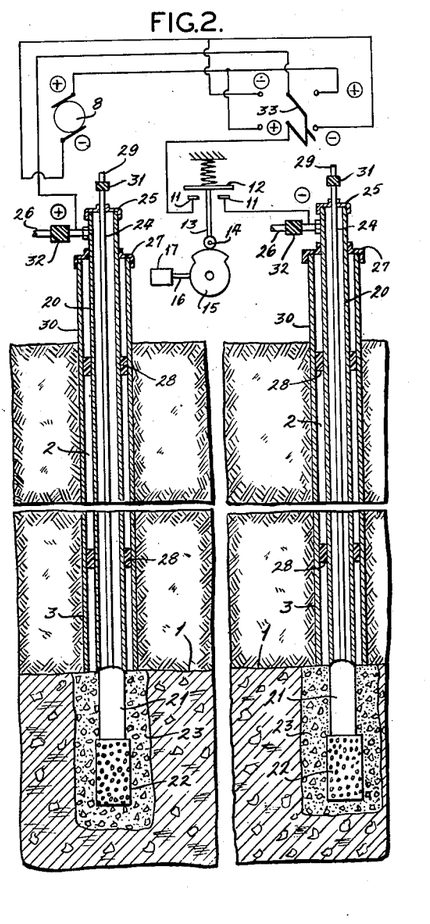
Figure 2 is a diagrammatic view illustrating another embodiment of this invention.

Figure 2 discloses an embodiment in which the electrodes are positioned in two well bores, either one or both of which may be the producing well. The producing formation is again shown at 1, and extending to the formation are well bores 2 each of which is provided with a casing 30 extending to the formation so as to again leave open holes. Since the wells are of the same general character, the description of one will be sufficient. Inside of the casing is the usual tubing 20 which has at its lower end a pump barrel 21 below which is a screen 22 surrounded by a gravel pack 23. The pump rod 24 extends through a packed cap 25, and the tubing has an oil outlet to a flow line 26. In this embodiment, the tubing is insulated from the casing by first insulating it from the casing head 27, which may be done by providing insulation between the casing head and the casing, or by making the casing head of insulating material such as one of the reinforced plastics. The tubing is further insulated by the casing by rings 28 of insulating material. The pump rod also has interposed in the connection 29 to the pump mechanism, insulation 31 and interposed in the flow line is an insulating collar 32. The tubings 20 are therefore again insulated from the ground above the producing formation 1, but the bottoms of the tubings extend directly to and make contacts with the formation.

In this embodiment, the generator 8 has its positive and negative terminals connected to the tubings, which are insulated from the casings and from the flow line and from the pumping mechanism, and in this case also the circuit breaker 12 may be provided as in Figure 1 to produce a pulsating but substantially unidirectional current. When the positive of the generator is connected to the left well, Figure 2, and the negative to the right well, there will be again impressed on the formation an electromotive force which will cause directly by virtue of the electromotive force directly impressed on the formation flow of current from the positive to the negative to cause a flow of oil in and along the formation from the positive well to the negative well in accordance with the amperage of the current flow along the formation.

In order to conveniently provide means for bringing about a flow of oil from the formation into the left well, a reversing switch 33 of conventional form is provided. When the switch is moved to the right, the positive will be at the left well and the negative at the right well; however, when the switch is moved to the left, then the positive will be impressed on the right well and the negative on the left well so as to cause a flow of current along the formation from the right well to the left well and a flow of oil in and along the formation from the positive to the negative and into the left well.

When the switch is in midposition as shown in Figure 2, the flow of current is entirely interrupted. Such capability of interruption of current is important for the following reason: It has been found that after the flow of oil from a positive well to a negative well has been well established, then such flow will continue for considerable time after the current has been entirely interrupted. Thus, it has been found that the flow will continue for days after the current has been interrupted entirely; a particular actual embodiment in which the wells were 600 feet deep and 800 feet apart, showing a continuance of flow of oil after interruption of the current for three days before the flow had diminished to the point before the initial application of the electric current. This can be readily established by the fact that, for instance, in that particular embodiment operating at 85 volts and with an initial flow of 125 amperes, the current after oil flow had started decreased from 125 to 10 or 15 amperes, thereby giving an indication of when electric current can be cut off. The reason for this continuance of oil flow after interruption of the current is probably due to the fact that the capillary attraction of the water and oil for the sands has been so far overcome so that the oil will continue to flow until the capillary held oil or water is again established. The reason for the decrease of the current, viz., from 125 to 10 or 15 amperes, is probably due to the fact that upon flow of oil from the positive to the negative the oil will be caused to migrate to the negative producing well; however, the flow of oil will continue as shown, even under conditions where the amperage of the current drops.

Alternately and by the provision of the switch 33, Figure 2, the application of the electromotive force to the wells may be reversed as described. Such reversal may be accomplished instead of interrupting the circuit as described. The reversal of the current is of utility. Such reversal enables the flow into both wells to take place alternately, so that the oil may be drawn from both wells. Furthermore, such reversal imposes on the formation, forces which acting alternately in opposite directions, may serve to more efficiently start the flow. By manipulation of the switch 33, Figure 2, the current may be reversed for a substantial period and thereafter again reversed for a substantial period, which periods may be days as heretofore described.

Figure 3:
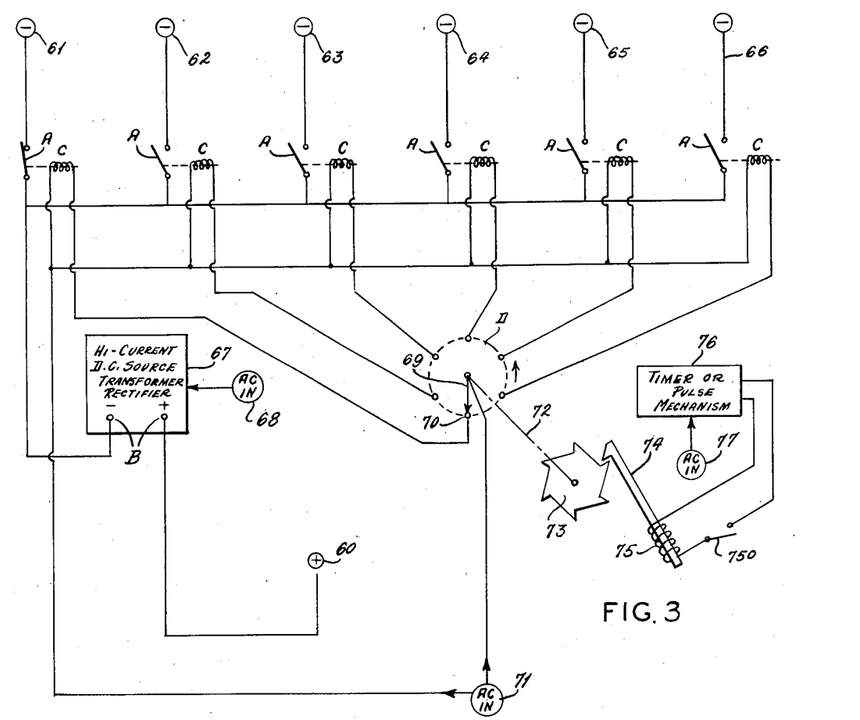
Figure 3 is a diagrammatic view illustrating still another embodiment of this invention.

Figure 3 discloses a convenient apparatus whereby the positive of an electromotive force may be applied at a single location to a formation to which extend a series of well bores and in which the negative is successively applied to those bores. While the negative wells may be connected in parallel to the positive well, the following is more convenient. In Figure 3, 60 designates a bore marked positive (+) which may be of the character shown in Figure 1 or in Figure 2, and 61, 62, 63, 64, 65 and 66 indicate producing well bores marked negative (−) extending to the formation. In Figure 3, 67 indicates a step down transformer rectifier of well-known construction supplied by a source of alternating current 68, the primary of which may be of comparatively high voltage, viz., 440 volts, whose secondary is connected to a rectifier, viz., of the full-wave dry plate type, so that the voltage will be reduced to deliver at the positive and negative terminals B of the apparatus 67 a moderate voltage, viz., 85 volts. The positive of the rectifier is connected to the formation at the well bore 60 while the negative of the rectifier is arranged to be successively connected to the various producing wells 61—66. To accomplish this, included in the connections from the negative of the rectifier to the producing wells 61—66 are circuit breakers A of any suitable construction, each having a movable contact adapted to engage a stationery contact to a lead to each of the wells 61—66, each controlled by its electromagnet-operating coil C. A distributor is indicated generally at D and this may be generally of the type employed in multicylinder internal combustion engines operating to successively connect the spark plugs with the source of current, except that it will be operated by absolute direct contacts instead of by an air gap type. This distributor has a movable contact 69 successively engaging contacts 70 in circuit with the several circuit breaker coils C, and the current may be supplied to the coils C from a source of current 71 which may be a source of direct current or a source of alternating current of viz., 110 volts. The shaft 72 of the contact 69 has a ratchet 73 with steps corresponding to the number of producing wells 61—66, and engaged by a pawl 74 actuated by a electric coil 75 in circuit with a timer 76 which may be of any suitable type, and it may be supplied from a source of current 77 which may be direct or alternating current. The timer may operate to close the circuit in relay or winding 75 at intervals, viz., every 10 seconds, that is, 6 cycles per minute.

The operation of the mechanism will be as follows. The circuit breakers A being normally open, when the contact 69 engages a contact 70 connected with the circuit breaker electromagnetic coil C influencing the circuit breaker A in the circuit leading to the well 61, the circuit breaker will be closed, so that while the positive of the electromotive force will be applied to the formation at well 60, the negative will be applied to the formation at well 61. As the contact 69 moves clockwise, the circuit to the coil C of circuit breaker A to the well 61 will be broken, and when this contact 69 reaches the next contact 70, the circuit to the second well 62 will be closed so as to apply a negative to that well. In this manner, the negative is successively applied to the wells 61—66. In this manner, current is caused to flow successively along the formation to successive producing wells extending to the formation and, of course, the electromotive force applied and the current flowing will be again pulsating in nature. As shown in Figure 3, a hand operated switch 750 may be provided whereby the electromotive force may be first applied to each of the wells 61—66 successively for periods until oil flow starts in each, the switch 750 being opened, when the contact 69 engages each of the contacts 70 for the respective relays C and circuit breakers A for the respective wells, for a period sufficient to permit starting of the oil flow. Thereafter, the switch 750 may be closed to effect automatic operation. Here again as in the described embodiment of Figure 2, and for the same purpose, the flow of current may be interrupted by opening the circuits of the sources 68 and 71, in which as usual a switch (not shown) will be provided.

Various modifications of the system may be employed by a procedure following generally of that employed in water flooding practice. Thus in such a water flooding practice, as disclosed by Uren, Petroleum Production Engineering, Oil Field Exploitation, 2nd edition, 1939, pages 453–456, a number of diagrams are shown in which a water injection well is shown in various relations to producing wells in the same producing area. In this case, and following generally Figure 3 above, the positive well may occupy the position of the water injection well and the successive producing wells 61—66, the producing wells in Uren's diagrams; and likewise there may be a series of positive wells such as 60 located in relation to producing negative wells corresponding respectively to the water injection and producing wells in Uren's diagrams.

In Figures 1 and 2, the source of substantial unidirectional electric current is a direct current generator 8, and the interruption of the circuit from the generator to the wells is by circuit breakers in the direct current circuit which, therefore, should be of the type to enable it to operate under conditions of comparatively high amperage. The substantially unidirectional electric current may, however, be supplied by a rectifier in circuit with a source of alternating current, whose primary is of a higher voltage than previously noted for the direct current circuit, so that when the circuit breaker is placed in the primary, the current will be made or broken in that primary, which is less than where the circuit breaker is in the direct current circuit. Such a system is shown in Figure 4 in connection with another embodiment of this invention.

Figure 4:
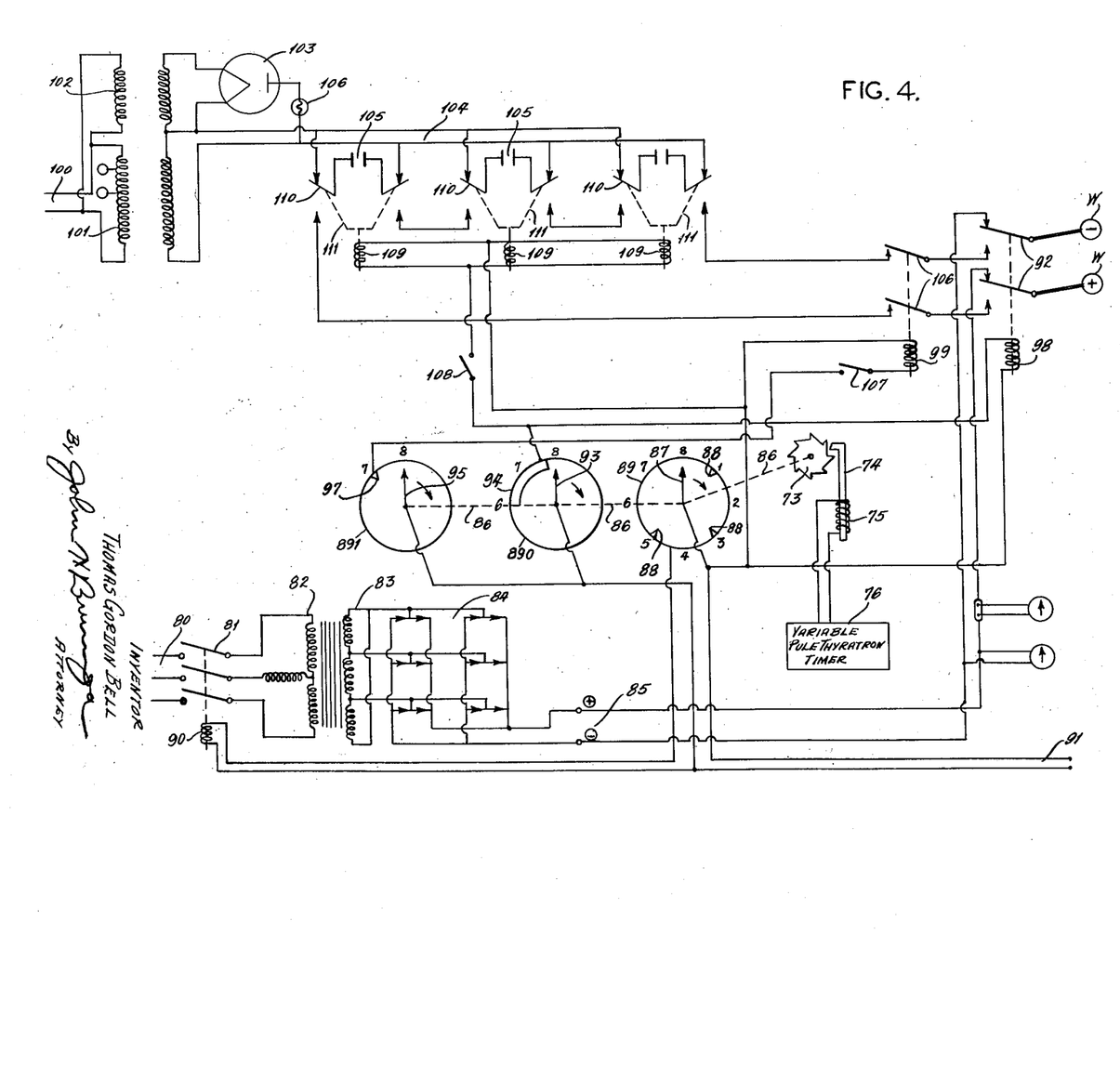
Figure 4 is a diagrammatic view illustrating still another embodiment of this invention.

Referring now to Figure 4, 80 designates an alternating current supply, such as a 440 three-phase sixty cycle current provided with a circuit breaker 81, and which supplies current to a step down transformer having a primary 82 and a secondary 83 connected in circuit with a full-wave dry plate type rectifier 84, so as to supply a substantially unidirectional current to a circuit 85 at a moderate voltage, viz., about 85 volts. A ratchet 73 is operated by a pawl 74 actuated by a coil 75 in circuit with a timer or pulse mechanism 76 similar to that shown in Figure 3. The shaft 86 driven from the ratchet 73 is shown only diagrammatically, and has mounted thereon a movable contact 87 insulated from 89 and 86 and movable clockwise to positions 1—8 corresponding in number to the number of ratchet teeth and cooperating with stationary contacts 88 which may correspond half in number to the number of ratchet teeth. In the drawing, only three contacts 88 are shown, one at position 7 being omitted for a purpose later explained, but they may be spaced equally at positions 1, 3, 5 and 7, except as noted above. These contacts 88 are mounted on an insulated metallic ring 89 which is connected by a lead to one end of the coil 90 for operating the circuit breaker 81, which coil 90 is also connected with one of the terminals of a circuit 91, which may be a 110 volt single-phase sixty cycle source 91 of supply. The other terminal of the source is connected to the contact 87. The circuit 85 is connected to circuit breakers 92 which are normally closed in the position shown in Figure 4 and are connected to the positive and negative of wells indicated generally at W(+) and W(−). An ammeter and a voltmeter are shown connected in the circuit 85.

Assuming the parts so far described being in the position shown in Figure 4 and with the circuit breaker 81 open, upon contact of the movable contact 87 with a stationary contact 88, brought about by operation of the ratchet 73, current from the alternating current source 91 will periodically energize the electromagnet coil 90 for and to close the circuit breaker 81. This will cause the rectifier to deliver a unidirectional current to the circuit 85 so as to impress the positive of an electromotive force on one well W(+) and a negative on another well W(−), in a like manner as in Figure 2. The current in circuit 85 and to the formation is, however, interrupted as the ratchet 73 moves the contact 87 away from the contact 88 so that the circuit breaker 81 will be permitted to open in the usual manner as by spring pressure. Such operation will continue so that a pulsating or interrupted current is supplied to the circuit 85 so as to impress a pulsating or periodically interrupted electromotive force on the formation of the wells W(+) and W(−). The operation will, therefore, be substantially as in Figure 2, except that the making and breaking of the circuit is on the primary high voltage side of the supply circuit 80, so that the current which must be interrupted is smaller than if it was interrupted on the direct current side.

In accordance with another embodiment, an electromotive force of moderate potential is successively impressed upon the formation as so far described; that is, however, followed by impressing on the formation an electromotive force of substantially high potential on the formation. That is accomplished as follows:

Referring again to Figure 4, 100 designates a source of alternating current, viz., of 110 volts single-phase sixty cycles. This source is connected with a step-down transformer 102 which reduces the voltage to about 6 volts. The current from the secondary transformer is supplied to the filament of a rectifier 103 of a type, as used in radio transmitters. The rectified half wave current from the tube is supplied from the secondary of a step up transformer 101, whose primary has a series of taps, and which delivers current at a relatively high voltage, viz., from 1,000 to 3,000 volts to a circuit 104, which has a series of capacitors 105 shown as connected in parallel, only three of which are shown in Figure 4. In practice, ten such capacitors each rated at 110 microfarads and 3,000 volts direct current have been connected in parallel and surged to 1,000 volts direct current or greater as required. The power used to surge the capacitors is supplied by the low current half wave rectifier assembly as shown, and a current limiter 106 is used in the output between the rectifier tube and the capacitors to prevent tube failure and to insure a slow charging rate of the capacitors.

In Figure 4, in which one of the contacts 88 at the 7 position is omitted, connected with the same shaft 86 as is contact 87 is a contact 93 arranged to contact with a long stationary contact 94 on an insulated stationary ring 890. Another movable contact 95 is mounted on the shaft 86 to contact with a short stationary contact 97 on an insulated ring 891. The movable contacts 93 and 95 are mechanically but insulatedly connected to the ratchet-operated shaft 86 insulated from 88, 890, 891 and 86 and moved clockwise simultaneously with the movement of contact 87. The majority of the stepping operations of contacts 93 and 95 do not result in electrical contacts to any circuit. When, however, contact 93 does engage contact 94, at which time contact 87 is on the 6 open circuit position, two electrical functions occur. Circuit breaker 92 controlled by the electromagnetic coil 98 is moved down so that the well circuit is disconnected from the power source 85 and is connected to the high voltage condenser load through the circuit breaker 106 which was in open condition at this position of the stepping switch mechanism. In this position, it should be noted that the moderate voltage power source 85 will have been isolated from the circuit to the wells. In the next step 7 of the switch assembly mechanism, at which time the contact 87 is in that 7 open circuit position, the electrical connection between contacts 93 and 94 will be maintained, but in addition, contact 95 will now engage contact 97 at the 7 position causing the electromagnet coil 99 to be included in the electric circuit to close breaker 106, provided the hand-operated switch 107 is in closed position. It will be seen from Figure 4, that after operation of 109 and 110 explained below, the full condenser load will then be discharged into the well at the 7 position.

The relation of the movable contacts 87, 93, and 94, to their cooperating contacts 88, 94, and 97, is such that after a predetermined number of steps imparted to the shaft 86 by the pawl 75 and the ratchet 73, moving the contacts 87, 93, and 95 clockwise, the moderate voltage circuit will be opened and disconnected from the wells while the high voltage circuit will be closed and connected with the wells. Thus, if for example, as shown in Figure 4, the number of teeth on the ratchet 73 are eight in number, the operation will be as follows: Starting on position 8 of the stepping switch assembly, the relationship of contacts 88, 94 and 97 is such that a moderate voltage direct current of three pulsations will be delivered to the wells. After the third moderate voltage pulsation has been delivered to the wells occurring at position 5, the moderate voltage source 85 will thereafter be isolated from the well circuit because there is no contact like 88 at the 6 position. On the next step 6 of the ratchet, contact 93 will engage contact 94 so that current is supplied to the electromagnet 98 to move the circuit breaker 92 down to isolate the well circuit from the moderate voltage source. At this same 6 position, the capacitors 105 are reconnected from a parallel condition to a series condition, by the contacts 93 and 94, allowing current from the moderate voltage direct current source to flow into the circuit breaker electromagnet 109 that actuates the circuit breakers 110. This occurs, of course, when the safety switch 108 is in closed position. On the next step 7, the high voltage load in the capacitors is discharged into the wells through circuit breaker 106 that is closed by the electromagnet coils 99 through the circuit just made by the contacts 95 and 97. Safety switch 107 must be closed for this operation. It will be noted that contacts 93 and 94 are in a circuit making position on both steps 6 and 7. The operation of three impulses are then repeated at moderate voltage as before. In actual practice the ratchet 73 has twenty-two teeth, so that there will be nine pulses of the moderate voltage current followed by a pulse of the high voltage circuit, again followed by nine pulses of low voltage, etc.

While a moderate potential pulsating current has been found satisfactory, by the systems described in connection with Figures 1–3, and also part of Figure 4, it is found that improved results are secured when a series of moderate potential impulses or electromotive forces of relatively long duration are applied to the formation, followed by the application of an electromotive force of relatively high potential but of relatively short duration. It seems that a pulsating current not only acts by virtue of such impulses to secure a more satisfactory flow of oil, but that the high potential electromotive force operates by a surge to accelerate such flow of the fluid. In accordance with this invention, however, a high voltage electromotive force may be periodically applied to the formation without applying a moderate voltage; viz., by omitting the contacts 87 and 88.

Figures 5, 7:
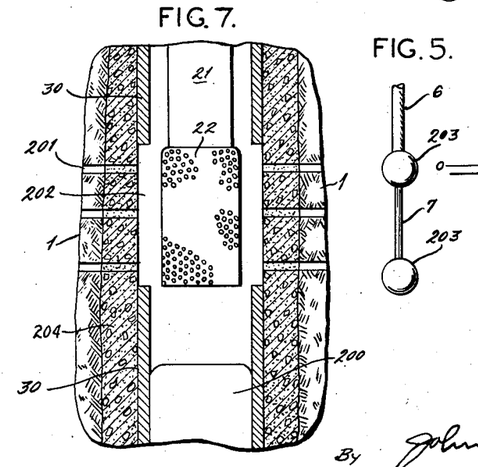
Figure 5 is a view of a form of an electrode capable of use.
Figure 7 is a detail showing the cutting of the casing adjacent the gun perforations and a packer.

In the system described in connection with Figures 1 and 2, the well is an open hole well, that is, the casing extends to the formation. Where that is not the case, see Figure 4, as where the casing and the formation extends below the formation and this casing and the concrete 204 is gun-perforated as shown at 201, the electrode at the end of an insulated wire or cable 6 may be let down between the tubing and the casing with fibre collars surrounding the electrode, as shown at 203 in Figure 5, so as to prevent the bare electrode 7 from touching either the tubing or the casing. The casing, see Figure 7, should, however, be cut out annularly in the regions of the gun perforations 201 by counterboring as previously described, for a considerable extent along the casing as shown at 202, so as to, in effect, terminate the casing adjacent the producing formation and so as to, in effect, provide an open hole. In such a case, the tubing, pump 21 and screen 22 may be set, as previously explained, in general practice, and the tubing may be insulated from the casing and from the pump rod and from the flow line, as shown in Figure 2. Moreover, as in general practice, the hole may be enlarged by counter-boring in the region of the cut casing and gravel packing around the screen, while a packing 200 may be set.

Figure 6:
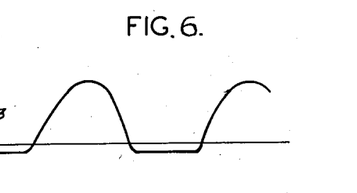
Figure 6 is a diagram of the wave of an asynchronous alternating current.

While in accordance with the embodiments previously described, the substantially unidirectional current is a direct current generated either by a direct current generator or by a rectified alternating current, the current employed may be an alternating current with an asymmetrical wave, as shown in Figure 6, in which the lower or negative part has a low amplitude with respect to the positive part. Dynamo-electric machines for producing such as asymmetric electrical current are well-known in the art; see German patent to Bataafsche No. 431,222 [1]. The asymmetric alternating current will, in effect, be a pulsating current particularly where the frequency is low, and frequencies as low as 10 and even 1 cycle per second may be attained. The asymmetric alternating current may however be periodically interrupted in the manner shown in the preceding description and accompanying drawings.

In accordance with this invention, therefore, means is provided for promoting the flow of the economic component of a producing formation into a well bore completed for production. The invention is of particular utitlity where the flow of the formation fluid into the producing well has decreased to such an extent as to warrant an increase of such flow. This invention is, of course, of great importance in the case of depleted wells where the flow has practically stopped, and in accordance with this invention, the flow may in many cases, be again started and when once started, the flow will continue for an extended time. This invention is, however, also of utility in starting production from a formation, particularly where acidizing and explosives have not been successful, or as an alternative thereto. In such a case, particularly after the removal of the drilling fluid deposit and coating on the well bore by swabbing, an electromotive force may be applied to the formation to start production. While the invention is particularly useful in promoting the flow of oil from a producing formation into a producing well, it is also of utility in promoting the flow of natural gas into the well; for in some cases, the pressure of the gas in the formation may not be sufficient to cause it to flow into the producing well. Gas usually occurs with oil, but where it occurs with water, the starting of the flow of water will break down the capillary attraction so as to promote the flow of gas into the producing well.

The question of whether or not the formation must contain an electrolyte in the form of salt water is really academic, because producing formations practically universally carry salt water; and from what has been said before, production will continue after the flow from the formation into the producing well is practically oil, evidenced by the fact that in the example given, upon such

---

[1] See also Electrophorese, Electromose, Electrodialyse, by Prausnitz and Reistotter, 1931, pages 244, etc.

flow of oil, the amperage drops from about 125 amperes to even 10 amperes.

While an illustrative example has been given, these will, for convenience, again be briefed. In four open hole oil wells at Dupo, Illinois, across the river from St. Louis, the wells were from 710 to 789 feet deep, with the spacing between them from 350 to 660 feet. The apparatus was substantially that shown in Figure 2. The electromotive force was impressed on the formation at 70 to 75 volts, with an initial amperage of about 110 to 75 amperes, which dropped to 10 to 15 amperes after the oil started to flow into the producing well. The circuit was broken twelve times a minute in the alternating current circuit in a manner as shown in Figure 4, with equal make and break periods. The formation was Trenton limestone. The production of oil from one of these wells during seven months was 1626 barrels; however, by the employment of the process and apparatus embodying this invention, production was increased to 3381 barrels in a seven months period following the first seven month period; i. e., the production more than doubled.

In the Abilene, Texas, field where the producing oil formation was a sand formation and the wells were 3500 feet deep with the spacing of 600 feet, the procedures described in connection with Figures 2 and 4 were employed. In the Figure 2 installation, the make and the break were 22 pulses per minute with equal makes and breaks. The flow of oil was practically doubled. However, by the employment of the Figure 4 installation, the pulses in the moderate voltage direct current circuit were again 22 pulses per minute; and this was continued for nine steps. On the tenth step, the high voltage electromotive force was applied with a result that the flow of oil to the producing well was a gain greatly increased, in fact, tripled or quadrupled, and there was even an increase of flow into adjoining wells in the same area, although they were not connected as in Figure 4.

While the theory of the operation of applicant's invention cannot be indisputably definitely established because the actions take place hundreds of feet under ground, the following is advanced as a probable theory. It is believed that applicant's invention operates on the basis of electro-osmosis or electro-endosmosis. This theory was explored to a substantial extent by Quincke in "Annalen der Physic und Chemie" of 1861, series 2, vol. 113, p. 513, etc. Quincke established the following: that the movement of the liquid is proportional to the electromotive force impressed and in accordance with the current (that is the quantity of the electric charge) passing along the liquid (capillary tube); that the movement of the liquid increases with the length of the fluid passage and with decreases of cross section, but with increases of inside area; that the flow of the liquid decreases with the external electrical resistance, and actually decreases with the addition of salts to water. Abramson in Electrokinetic Phenomena, 1934, page 25, etc., came to the following conclusions: that addition of salts and acids to water diminish the movement of the liquid as do sulphates; that alcohol increases the movement of the liquid; that the movement of the liquid is proportional to the impressed electromotive force and to the current; that the liquid movement is increased by the resistance of the liquid passage and by the addition of alcohol, and is independent of the viscosity of the fluid; that only a small percentage of electrolyte is necessary for movement. Furthermore, that streaming potential, that is currents established by flow of the liquid, causes a flow of the current in the direction of the liquid flow and that the addition of salts and acids diminish the current flow.

The above seems to substantiate what has been observed in the application of applicant's invention as above described and observed. In accordance with applicant's invention and in accordance with Quincke's observations, the movement of the oil along the formation from the positive to the negative producing well is brought about by an electromotive force impressed and in accordance with the current passing along the formation and the oil therein. Furthermore, applicant's process in which oil flow will continue at a reduced current flow (from 125 amperes to 10 or 15 amperes) agrees with the observations of Quincke and Abramson that in order to produce a flow of a liquid by electro-osmosis or electro-endosmosis, the liquid need not be an electrolyte. Quincke originally employed condensers which were charged and then impressed upon the fluid column, and he obtained a greater effect than by direct current from Grove batteries; that seems to substantiate the greater effect of the capacitors of Figure 4. While Quincke found that an induced current would only cause a movement of the fluid in one direction, that, is upon opening of the circuit, he found that the liquid movement was greater than by the employment of direct current from a battery of Grove cells; and that again agrees with applicant's observation that an asynchronous current is practical. The above also establishes the advantage of employing an interrupted or pulsating current rather than a steady current which is not interrupted. Applicant further found that in the Dupo installation, after flow had started and the source of current disconnected, when the voltage from the terminals of the end of the formation was measured, it was found that this voltage was 6 volts, that is, there was a streaming potential as observed by Quincke, Pogg. Ann. 107, 1, Abramson, p. 28.

The question of whether or not there must be a medium capillary in its nature, or whether there must be a diaphragm, is really academic. Quincke employed tubes of 0.9 mm., Abramson, pp. 30–31; however, the capillary need not be straight, but can have any shape, pp. 50–51. Now in a producing formation the oil occurs in spaces between sand grains and in otherwise narrow passages, which form in effect capillary passages, even analogous to those in a diaphragm.

While, therefore, the above theory has been given, it is to be understood that this invention is not to be restricted to a particular theory, which has simply been advanced to facilitate the explanation of the probable theory of the operation of applicant's invention.

With reference to the above description and in the claims, the following is to be observed: The well bore is one which has been completed for production, as previously described, viz., that is one in which after drilling, any drilling fluid adjacent the producing formation, has been removed, so as not to seal the formation against inflow of oil into the well. The electromotive force is directly impressed on the formation and on the oil therein, with such electromotive force being of a character and voltage or potential sufficient to cause, directly by virtue of the electromotive force so impressed and by virtue of a high resulting current along the formation, flow of oil in and along the formation from the positive to the negative and into a well bore. The positive of the electromotive force is impressed on the formation a substantial distance from the well bore, corresponding to the distances wells in a producing field are spaced in practice. The electromotive force so impressed is that of a source of substantially unidirectional source of current. Furthermore, the source of current is of a character so that the voltage will be of a sufficient potential to cause a resulting high current along the formation; viz., initially on the order of 110 amperes, which may drop to 15 amperes after oil flow starts. The source is specifically a substantially unidirectional pulsating electric current in which the pulsations are of substantial durations, viz., on the order of one or more pulsations per minute, as distinguished from the durations of wave peaks of low differential amplitudes and durations, on the order of many per second, which latter occur in the rectification of current by a commutator of a practical direct current generator. An asynchronous alternating electric current having a positive of high and a negative of low amplitude, is substantially a direct current, and it can have, as previously shown, durations on the order as low as one cycle per second; however, here again, that current may be a pulsating current, with the pulsations of substantial durations as described.

Having thus described the invention, what is claimed and desired to be secured by Letters Patent is:

1. In the art of promoting flow of oil from an oil bearing formation into a well bore extending to the formation and completed for production of oil therefrom, the process comprising, impressing on an electrode contacting directly with the formation and on oil therein, at a substantial distance from the well bore, the positive of an electromotive force of a source of a substantially unidirectional electric current of which the negative of the electromotive force is directly impressed on another electrode contacting directly with the formation adjacent the well bore, the electromotive force impressed on the electrodes being of a character and the voltage thereof being of sufficient potential, about 70 volts, to cause directly by virtue of the electromotive force so impressed and by virtue of a high resulting current, about 10 amperes, along the formation, flow of oil in and along the formation from the positive to the negative and into the well bore in accordance with the amperage of the current flow along the formation from the positive to the negative.

2. In the art of promoting flow of oil from an oil bearing formation into a well bore extending to the formation and completed for production of oil therefrom, the process comprising, impressing directly on the formation and on oil therein, at a substantial distance from the well bore, the positive of an electromotive force of a source of a substantially unidirectional electric current pulsating at a low frequency and of which the negative of the electromotive force is directly impressed on the formation adjacent the well bore, the electromotive force impressed on the formation being of sufficient potential to cause, directly by virtue of the electromotive force so impressed and by virtue of a high resulting current along the formation, flow of oil in and along the formation from the positive to the negative and into the well bore in accordance with the amperage of the current flow along the formation from the positive to the negative.

3. In the art of promoting flow of oil from an oil bearing formation into a well bore extending to the formation and completed for production of oil therefrom, the process comprising, impressing on an electrode contacting directly with the formation and on oil therein adjacent a second well bore and located at a substantial distance from the first well bore, the positive of an electromotive force of a source of a substantially unidirectional electric current of which the negative of the electromotive force is directly impressed on another electrode contacting directly with the formation adjacent the first well bore, the electromotive force impressed on the electrodes being of a character and the voltage thereof being of sufficient potential, about 70 volts, to cause directly by virtue of the electromotive force so impressed and by virtue of a high resulting current, about 10 amperes, along the formation, flow of oil in and along the formation from the positive to the negative and into the first well bore in accordance with the amperage of the current flow along the formation from the positive to the negative.

4. In the art of promoting flow of oil from an oil bearing formation into a well bore extending to the formation and completed for production of oil therefrom, the process comprising, impressing directly on the formation and on oil therein, at a substantial distance from the well bore, the positive of an electromotive force of a source of a substantially unidirectional electric current of which the negative of the electromotive force is directly impressed on the formation adjacent the well bore, and periodically interrupting at a low frequency the application of the electromotive force to said formation, the electromotive force impressed on the formation being of sufficient potential to cause, directly by virtue of the electromotive force so impressed and by virtue of a high resulting current along the formation, flow of oil in and along the formation from the positive to the negative and into the well bore in accordance with the amperage of the current flow along the formation from the positive to the negative.

5. In the art of promoting flow of oil from an oil bearing formation into a well bore extending to the formation and completed for production of oil therefrom, the process comprising, impressing directly on the formation and on oil therein, adjacent a second well bore and located at a substantial distance from the first well bore, the positive of an electromotive force of a source of a substantially unidirectional electric current of which the negative of the electromotive force is directly impressed on the formation adjacent the first well bore, the electromotive force impressed on the formation being of a character and the voltage thereof being of sufficient potential to cause, directly by virtue of the electromotive force so impressed and by virtue of a high resulting current along the formation, flow of oil in and along the formation from the positive to the negative and into the first well bore in accordance with the amperage of the current flow along the formation from the positive to the negative, reversing for a substantial period the flow of the current from said source so as to impress the positive of the electromotive force on the formation adjacent the first well bore and the negative of the electromotive force on the formation adjacent the second well bore and thereafter again reversing the flow of the current for a substantial period.

6. In the art of promoting flow of oil from an oil bearing formation into a series of well bores extending to the formation and completed for production of oil therefrom, the process comprising, impressing directly at a single location on the formation and on oil therein, at substantial distances from said well bores, the positive of an electromotive force of a substantially unidirectional electric current, and impressing negatives of the electromotive force of said source directly on the formation adjacent the respective well bores, the electromotive force impressed being of a character and the voltage thereof sufficient to cause, directly by virtue of the electromotive force so impressed and by virtue of a high resulting current along the formation, flow of oil in and along the formation from the positive to the negatives and into the respective bores in accordance with the amperages of the current flow along the formation from the positive to the negatives adjacent the respective well bores.

7. In the art of promoting flow of oil from an oil bearing formation into a series of well bores extending to the formation and completed for production of oil therefrom, the process comprising, impressing directly at a single location on the formation and on oil therein, at substantial distances from said well bores, the positive of an electromotive force of a substantially unidirectional electric current, and impressing negatives of the electromotive force of said source successively directly on the formation adjacent the respective well bores, the electromotive force impressed being of a character and the voltage thereof sufficient to cause, directly by virtue of the electromotive force so impressed and by virtue of a high resulting current along the formation, flow of oil in and along the formation from the positive to the negatives and into the respective bores in accordance with the amperages of the current flow along the formation from the positive successively to the negatives adjacent the respective well bores.

8. In the art of promoting flow of oil from an oil bearing formation into a series of well bores extending to the formation and completed for production of oil therefrom, the process comprising, impressing directly at a single location on the formation and on oil therein, adjacent an additional well bore and located at substantial distances from said first well bores, the positive of an electromotive force of a substantially unidirectional electric current, and impressing negatives of the electromotive force of said source directly on the formation adjacent the first respective well bores, the electromotive force impressed being of a character and the voltage thereof sufficient to cause, directly by virtue of the electromotive force so impressed and by virtue of a high resulting current along the formation, flow of oil in and along the formation from the positive to the negatives and into the respective first well bores in accordance with the amperages of the current flow along the formation from the positive to the negatives adjacent the respective first well bores.

9. In the art of promoting flow of oil from an oil bearing formation into a series of well bores extending to the formation and completed for production of oil therefrom, the process comprising, impressing directly at a single location on the formation and on oil therein, adjacent an additional well bore and located at substantial distances from said first well bores, the positive of an electromotive force of a substantially unidirectional electric current, and impressing negatives of the electromotive force of said source successively directly on the formation adjacent the first respective well bores, the electromotive force impressed being of a character and the voltage thereof sufficient to cause, directly by virtue of the electromotive force so impressed and by virtue of a high resulting current along the formation, flow of oil in and along the formation from the positive to the negatives and into the respective first well bores in accordance with the amperages of the current flow along the formation from the positive successively to the negatives adjacent the respective first well bores.

10. In the art of promoting flow of oil from an oil bearing formation into a series of well bores extending to the formation and completed for production of oil therefrom, the process comprising, impressing directly on the formation and on oil therein, at substantial distances from said well bores, the positive of an electromotive force of a substantially unidirectional electric current, impressing negatives of the electromotive force of said source directly on the formation adjacent the respective well bores, and periodically interrupting at a low frequency the application of the electromotive force to said formation and to said wells, the electromotive force impressed being sufficient to cause, directly by virtue of the electromotive force so impressed and by virtue of a high resulting current along the formation, flow of oil in and along the formation from the positive to the negatives and into the respective well bores in accordance with the amperages of the current flow along the formation from the positive to the negatives adjacent the respective well bores.

11. In the art of promoting flow of oil from an oil bearing formation into a series of well bores extending to the formation and completed for production of oil therefrom, the process comprising, impressing directly on the formation and on oil therein, at substantial distances from said well bores, the positive of an electromotive force of a substantially unidirectional electric current, impressing negatives of the electromotive force of said source successively directly on the formation adjacent the respective well bores, and periodically interrupting at a low frequency the application of the electromotive force to said formation and to said wells, the electromotive force impressed being sufficient to cause, directly by virtue of the electromotive force so impressed and by virtue of a high resulting current along the formation, flow of oil in and along the formation from the positive to the negatives and into the respective well bores in accordance with the amperages of the current flow along the formation from the positive successively to the negatives adjacent the respective well bores.

12. In the art of promoting flow of oil from an oil bearing formation into a series of well bores extending to the formation and completed for production of oil therefrom, the process comprising, impressing directly on the formation and on oil therein, at substantial distances from said well bores, the positive of an electromotive force of a substantially unidirectional electric current, impressing negatives of the electromotive force of said source successively directly on the formation adjacent the respective well bores, and periodically interrupting at a low frequency the application of the electromotive force to said formation and successively to said well bores, the electromotive force impressed being sufficient to cause, directly by virtue of the electromotive force so impressed and by virtue of a high resulting current along the formation, flow of oil in and along the formation from the positive to the negatives and into the respective well bores in accordance with the amperages of the current flow along the formation from the positive successively to the negatives adjacent the respective well bores.

13. In the art of promoting flow of oil from an oil bearing formation into a well bore extending to the formation and completed for production of oil therefrom, the process comprising, impressing directly on the formation and on oil therein, at a substantial distance from the well bore, the positive of an electromotive force of a source of a substantially unidirectional electric current derived from a rectified alternating current circuit, of which rectified current the negative of the electromotive force is impressed directly on the formation adjacent the well bore, and periodically interrupting at a low frequency the alternating current circuit, the electromotive force impressed on the formation being of sufficient potential to cause, directly by virtue of the electromotive force so impressed and by virtue of a high resulting current along the formation, flow of oil in and along the formation from the positive to the negative and into the well bore in accordance with the amperage of the current flow along the formation from the positive to the negative.

14. In the art of promoting flow of oil from an oil bearing formation into a well bore extending to the formation and completed for production of oil therefrom, the process comprising, impressing directly on the formation and on oil therein, successively and repetitiously, electromotive forces of moderate and high voltages derived from sources of substantially unidirectional current, of which the positives are successively directly impressed on the formation at a substantial distance from the well bore and of which the negatives are successively impressed adjacent the well bore, the electromotive forces being of sufficient potentials to cause, directly by virtue of the electromotive forces so impressed and by virtue of high resultant currents along the formation, flow of oil in and along the formation from the positives to the negatives and into the well bore.

15. In the art of promoting flow of oil from an oil bearing formation into a well bore extending to the formation and completed for production of oil therefrom, the process comprising, impressing adjacent said first well and directly on the formation and on oil therein, successively and repetitiously, electromotive forces of moderate and high voltages derived from sources of substantially unidirectional current, of which the positives are successively directly impressed on the formation adjacent a second well bore and located at a substantial distance from the first well bore and of which the negatives are successively directly impressed adjacent the first well bore, the electromotive forces being of sufficient potentials to cause, directly by virtue of the electromotive forces so impressed and by virtue of high resultant currents along the formation, flow of oil in and along the formation from the positives to the negatives and into the first well bore.

16. In the art of promoting flow of oil from an oil bearing formation into a well bore extending to the formation and completed for production of oil therefrom, the process comprising, impressing directly on the formation and on oil therein, successively, electromotive forces of moderate and high voltages derived from sources of substantially unidirectional current pulsating at a low frequency, of which the positives are successively directly impressed on the formation at a substantial distance from the well bore and of which the negatives are successively directly impressed adjacent the well bore, the electromotive forces being of sufficient potentials to cause, directly by virtue of the electromotive forces so impressed and by virtue of high resultant currents along the formation, flow of oil in and along the formation from the positives to the negatives and into the well bore.

17. In the art of promoting flow of oil from an oil bearing formation into a well bore extending to the formation and completed for production of oil therefrom, the process comprising, impressing directly on the formation and on oil therein, successively, electromotive forces of moderate and high voltages derived from sources of substantially unidirectional current, of which the positives are successively directly impressed on the formation at a substantial distance from the well bore and of which the negatives are successively directly impressed adjacent the well bore, and periodically interrupting at a low frequency the application of the electromotive force of moderate voltage to said formation, the electromotive forces being of sufficient potentials to cause, directly by virtue of the electromotive forces so impressed and by virtue of high resultant currents along the formation, flow of oil in and along the formation from the positives to the negatives and into the well bore.

18. In the art of promoting flow of oil from an oil bearing formation into a well bore extending to the formation and completed for production of oil therefrom, the process comprising, impressing directly on the formation and on oil therein, successively, electromotive forces of moderate and high voltages derived from sources of substantially unidirectional current, of which the positives are successively directly impressed on the formation adjacent a second well bore and located at a substantial distance from the first well bore and of which the negatives are successively directly impressed adjacent the first well bore, and periodically interrupting at a low frequency the application of the electromotive force of moderate voltage to said formation, the electromotive forces being of sufficient potentials to cause, directly by virtue of the electromotive forces so impressed and by virtue of high resultant currents along the formation, flow of oil in and along the formation from the positives to the negatives and into the first well bore.

19. In the art of promoting flow of oil from an oil bearing formation into a well bore extending to the formation and completed for production of oil therefrom, the process comprising, periodically directly impressing on the formation and on oil therein, at a substantial distance from the well bore and for short durations, the positive of an electromotive force of a source of a substantially unidirectional high voltage electric current, with interruptions of the current between such impressions of the electromotive force, of which the negative of the electromotive force is directly impressed on the formation adjacent the well bore, the electromotive force impressed on the formation being of a character and the voltage thereof being of sufficient potential to cause, directly by virtue of the electromotive force so impressed and by virtue of a high resulting current along the formation, flow of oil in and along the formation from the positive to the negative and into the well bore in accordance with the amperage of the current flow along the formation from the positive to the negative.

References Cited in the file of this patent

UNITED STATES PATENTS

| | | |
|---|---|---|
| 1,372,743 | Gardner | Mar. 29, 1921 |
| 1,784,214 | Workman | Dec. 9, 1930 |
| 2,217,857 | Byck | Oct. 15, 1940 |

OTHER REFERENCES

Standard Handbook for Elec. Eng., 6th ed. (1933), pp. 942–3 cited. Pub. by McGraw-Hill Book Co., New York, N. Y.